United States Patent [19]

Rothenberg et al.

[11] Patent Number: 5,368,745

[45] Date of Patent: Nov. 29, 1994

[54] METHOD OF FLOCCULATING LOW METAL OXIDE CONTENT SOLIDS IN A LIQUID

[75] Inventors: Alan S. Rothenberg, Wilton; Roderick G. Ryles, Milford, both of Conn.; Peter So, Calgary, Canada

[73] Assignee: Cytec Technology Corp., Wilmington, Del.

[21] Appl. No.: 127,201

[22] Filed: Sep. 2, 1993

[51] Int. Cl.⁵ .................................................. C02F 1/56
[52] U.S. Cl. ........................................ 210/734; 210/735
[58] Field of Search .................................. 210/734, 735

[56] References Cited

U.S. PATENT DOCUMENTS

| | | |
|---|---|---|
| 3,345,344 | 10/1967 | Fetscher et al. |
| 3,864,323 | 2/1975 | Stoy. |
| 3,975,496 | 8/1976 | Smalley et al. ............ 210/734 |
| 4,480,067 | 10/1984 | Vio et al. .................... 524/446 |
| 4,532,046 | 7/1985 | Meunier et al. ............ 210/698 |
| 4,536,296 | 8/1985 | Vio .............................. 525/377 |
| 4,545,902 | 10/1985 | Connelly et al. ........... 210/734 |
| 4,587,306 | 5/1986 | Vio et al. .................... 525/354 |
| 4,647,382 | 3/1987 | Sharpe, Jr. .................. 210/734 |
| 4,767,540 | 8/1988 | Spitzer et al. ............... 210/728 |
| 4,783,270 | 11/1988 | Murao et al. ............... 210/734 |
| 4,786,318 | 11/1988 | Owen et al. ................ 210/734 |
| 4,789,485 | 12/1988 | Field et al. .................. 210/727 |
| 4,816,166 | 3/1989 | Cawiezel .................... 210/734 |
| 4,875,935 | 10/1989 | Gross et al. ................ 210/734 |
| 4,902,751 | 2/1990 | Lewellyn et al. ........... 525/340 |
| 5,099,928 | 3/1992 | Bouchut et al. ............ 175/57 |
| 5,128,420 | 7/1992 | Domb et al. ................ 525/377 |
| 5,217,620 | 6/1993 | Mahoney et al. ........... 210/728 |

OTHER PUBLICATIONS

S. A. RaviShankar et al., "Selective Flocculation of iron oxide-kaolin mixtures using a modified polyacrylamide flocculant", Bull. Mater. Sci. vol. 10, No. 5, Aug. 1988, pp. 423–433.

E. A. Appleton, et al., Journal of the South African Institute of Mining and Metalllurgy, vol. 76, pp. 117–119, 1975.

Primary Examiner—Neil McCarthy
Attorney, Agent, or Firm—F. M. Van Riet; C. M. Schultz

[57] ABSTRACT

A process for flocculating, in a liquid other than Bayer process streams, suspended solids comprised primarily of minerals other than iron oxide and tin oxide. The solids are contacted with a hydroxamated polymer. The amount of hydroxamated polymer is sufficient to increase the settling rate of the solids and to decrease the turbidity of the solids.

11 Claims, No Drawings

METHOD OF FLOCCULATING LOW METAL OXIDE CONTENT SOLIDS IN A LIQUID

TECHNICAL FIELD

The present invention is directed to a process of flocculating, in a liquid, suspended particles comprising at least two minerals. The present invention is also directed to a process of flocculating, in a liquid, suspended particles primarily comprising minerals other than iron oxide or tin oxide minerals. More particularly, the present invention is concerned with the use of a hydroxamated polymer, such as hydroxamated polyacrylamide, for flocculating such particles.

BACKGROUND OF THE ART

Ore is generally mined for the economically valuable minerals that can be extracted therefrom. In addition to the valuable minerals, ore also contains gangue minerals, which are waste products. The major classifications of minerals present in ore are native elements, sulfide and sulfo minerals, oxides and hydrated oxides, halogen minerals, nitrates, carbonates, borates, sulfate types, sulfite types and silicates. Iron, for example, may be present in the form of oxides, such as hematite ($Fe_2O_3$) and magnetite ($FeFe_2O_4$), or in the form of non-oxides, such as pyrrhotite (FeS), pyrite ($FeS_2$), siderite ($FeCO_3$), etc. In order to recover the valuable minerals of the ore, generally the ore is ground into fine particles and the valuable minerals are separated from the other minerals of the ore by a process such as froth flotation. In froth flotation, valuable minerals adhere to the froth bubbles and can be removed as part of the froth. The remainder of the minerals are not removed and so remain in an aqueous dispersion. This remainder is collectively called the tailings, which usually includes significant amounts of gangue minerals. Silicates such as quartz ($SiO_2$) and clay minerals, when not mined as the valuable mineral, are also often present in significant amounts in the tailings. The clays that remain in the aqueous dispersion formed during froth flotation are difficult to separate from the aqueous dispersion because they absorb water. Accordingly, there remains to be developed an efficient method of separating such suspended solids of ore from the liquid of the aqueous dispersion that results from the flotation process.

In addition to froth flotation, it is known that iron oxide or tin oxide minerals can be separated as the valuable minerals from the other minerals present in the ore by selective flocculation using a hydroxamated polymer. In selective flocculation, macromolecules of the flocculent material are adsorbed by the particles to be flocculated. Hydroxamated polyacrylamide has been shown to selectively flocculate both iron oxide and tin oxide from other minerals. U.S. Pat. No. 4,902,751, is expressly incorporated herein by reference to the extent necessary to understand the polymers of the present invention. Similarly, Shankar et al. in Bull. Mater. Sci.; Vol. 10; pages 423–433 (1988) discloses that by using a hydroxamated polyacrylamide, synthetic iron oxide can be selectively flocculated from kaolin, a type of silicate clay mineral typically present in naturally occurring high alumina gangue content Indian iron ore deposits, when both are present in an aqueous dispersion. That is, the hydroxamated polyacrylamide was found to selectively flocculate the iron oxide minerals, but not the kaolin clay minerals. Hydroxamated polymers were further shown to be specific to iron oxide minerals by Spitzer et al. in U.S. Pat. No. 4,767,540, which discloses the use of hydroxamated polymers for flocculating red mud, an iron oxide mineral, in a process of separating the red mud from aluminate liquors produced during the Bayer process for purifying bauxite. Appleton et al. in Jour. So. African Inst. of Mining and Metallurgy; Vol. 76; pages 117–19 (1975) and Clauss et al. in Int. J. Miner. Proc.; Vol. 3; page 27 (1976) discloses that by using a hydroxamated polymer, synthetic cassiterite, a synthesized tin oxide mineral, can be selectively flocculated from quartz, a silicon dioxide mineral, when both are present in an aqueous solution. That is, the hydroxamated polymer was found to strongly adsorb on the cassiterite, but not at all on the quartz surface.

Presently, anionic polyacrylamides are generally used to flocculate dispersions of suspended solids having at least two minerals or suspended solids comprising primarily minerals other than iron oxide or tin oxide. However, the use of anionic polyacrylamides for such flocculation results in unpredictable settling and turbidity rates.

Therefore, a need exists for an efficient process for separating solids suspended in a liquid which solids have at least two minerals or primarily comprise minerals other than iron oxide or tin oxide.

SUMMARY OF THE INVENTION

An object of the present invention is to improve the efficiency of solid/liquid separation for the separation of suspended solids having at least two minerals or having minerals primarily other than iron oxide or tin oxide. The present invention relates to a process for flocculating, in a liquid, such solids by contacting the solids with a hydroxamated polymer. The hydroxamated polymer is added in an amount sufficient to increase the settling rate of the solids and in an amount sufficient to decrease the turbidity of the liquid. Preferably, the polymer is a hydroxamated acrylamide polymer.

DETAILED DESCRIPTION OF THE INVENTION

The hydroxamated polymer to be employed in the present invention can vary rather broadly in type, provided that it improves the rate of flocculation in a liquid of suspended solids comprised of at least two minerals or of primarily minerals other than iron oxide or tin oxide minerals as compared to the use of no polymer or a non-hydroxamated polymer. The useful hydroxamated polymers are best exemplified by those containing pendant group of Formula (I):

$$-C(O)-NH-OR \qquad (I)$$

wherein R is hydrogen or a cation. These hydroxamated polymers per se are known in the art and can be derived from polymers containing pendant ester, amide, anhydride, nitrile, etc., groups by the reaction thereof with hydroxylamine or its salt, as shown in the references incorporated herein by reference below.

Exemplary of the polymers which may be hydroxamated for use in the present invention are without limitation amide polymers such as those produced from acrylamide, methacrylamide and the like; acrylic polymers such as methacrylic polymers and the like; crotonic etc. acid ester polymers such as polymers produced from the polymerization of methyl acrylate, ethyl acrylate, t-butyl acrylate, methyl methacrylate, ethyl methacrylate, cyclohexyl methacrylate, dimethylaminoethyl methacrylate, dimethylaminoethylacrylate, methyl crotonate, etc.; polymers of maleic anhydride and esters thereof, and the like; and nitrile polymers such as those produced from acrylonitrile. Preferably, acrylamide polymers range in molecular weight from about $1 \times 10^4$ to $3 \times 10^7$.

Such hydroxamated polymers, as well as methods for their production are known to those skilled in the art and are specifically disclosed in U.S. Pat. Nos. 3,345,344; 4,480,067; 4,532,046; 4,536,296; 4,587,306; 4,902,751; 5,099,928 and 5,128,420. To the extent necessary to understand these polymers, the disclosure of those patents are expressly incorporated herein by reference thereto. Generally, these hydroxamated polymers may be produced by reacting the polymer containing the pendant reactive group, in solution, with a hydroxylamine or its salt at a temperature range of from about 20° C. to about 100° C., and most preferably from about 20° C. to about 60° C., for a time of from a few minutes to several hours. For the present invention, about 1-90% of the available pendant reactive groups of the polymer should be replaced by hydroxamic groups, and more preferably, from about 5-60%. Therefore, the degree of hydroxamation, i.e., the concentration of Formula (I) units in the polymers useful in the present flocculation process may range from about 1 to about 90 mole percent, preferably from about 5 to 60 mole percent.

In addition to reaction of hydroxylamine or its salt with a polymer solution, a polymer latex may be reacted directly with hydroxylamine or its salt. For example, the latex may comprise a copolymer of acrylamide and methacrylate or a copolymer of acrylic acid and methyl acrylate. In these cases, the hydroxylamine or its salt reacts primarily with the ester groups to form hydroxamic acid groups. Also, inverse emulsions made of copolymers such as aqueous polyacrylamide or acrylamide/acrylic acid copolymers dispersed in oil may be reacted directly with hydroxylamine or its salt to give very high molecular weight polymers containing hydroxamic acid groups. All of these materials function efficiently as flocculating agents in the processes of the present invention.

Suitable hydroxylamine salts include the sulfates, sulfites, phosphates, perchlorates, hydrochlorides, acetates, propionates and the like. The pH of the solution of the reactive polymer and the hydroxylamine or its salt is preferably adjusted to be at least about 3, most preferably over about 8, by means of appropriate acid or base additions to the solution. A general pH range is between about 3 and 14.

Preferably, the hydroxamated polymer has a solution viscosity of at least 4 mPa.s, preferably at least 6 and generally between about 2 and 12. Solution viscosity for the present invention is defined as a standard viscosity measurement of a 0.1% solution in 1M NaCl at 60 RPM and 25° C. using a Brookfield Viscometer and a UL adapter.

The hydroxamated polymers used in the present invention are employed by adding them, preferably in the form of an emulsion, to a suspension of solids comprised of at least two minerals or of primarily minerals other than iron oxide or tin oxide minerals in order to contact the hydroxamated polymer with the solids. These polymers are effective for flocculating such solids even when the iron oxide or tin oxide content of the solids is zero or near zero. Preferably, the solids are present in a slurry. The solids may be, for example, without limitation, a dispersion of suspended solids obtained from a platinum ore-body, a copper ore-an ore-body, a body from a diamond mine, a coal ore body or a tar-sand ore-body. The particles comprise at least two minerals or primarily comprise minerals other than iron oxide such as, without limitation, quartz, clay or mixtures thereof. Examples of the clays are, without limitation, any swelling clay, kaolinite, montmorillinite, bentonite or mixtures thereof. The amount of hydroxamated polymer contacted with the solids is generally from about 1 to 10,000 ppm, and preferably is from about 1 to 1000 ppm.

The foregoing and other objects, features aspects and advantages of the present invention will become more apparent from the following detailed nonlimiting examples of the present invention.

Polymers 1-11

Eleven hydroxamated polymers of acrylamide were prepared in accordance with the process disclosed and claimed in U.S. Pat. No. 4,902,751, assigned to American Cyanamid Company, and particularly the process disclosed at column 2, line 37 to column 4, line 2 of the same patent. The properties and characteristics of these polymers appear below in Table 1.

TABLE 1

| Polymer | Molecular Weight | Degree of conversion to hydroxamate groups (%) | Degree of conversion to carboxyl groups (%) | Solution Viscosity (mPa · s) |
|---|---|---|---|---|
| 1 | $1.5 \times 10^7$ | 20 | — | — |
| 2 | $1.5 \times 10^7$ | 10 | — | — |
| 3 | $1.5 \times 10^7$ | 60 | — | — |
| 4 | $1.5 \times 10^7$ | 5 | — | — |
| 5 | $1.5 \times 10^7$ | 10 | — | — |
| 6 | $1.5 \times 10^7$ | 10 | — | 11.4 |
| 7 | $1.0 \times 10^7$ | 14 | 9 | 5.3 |
| 8 | $1.0 \times 10^7$ | 20 | 15 | 4.8 |
| 9 | $1.0 \times 10^7$ | 20 | 19 | 4.6 |
| 10 | $1.0 \times 10^7$ | 24 | 23 | 4.8 |
| 11 | $1.0 \times 10^7$ | 33 | 23 | 4.6 |

EXAMPLES 1-6

To a slurry having a suspension of solids of platinum ore tailings was added varying doses of Polymer 1 by mixing at a pH of 8.25, while the sample was maintained at ambient temperature. The platinum ore tailings included 14.41% $Fe_2O_3$, but were primarily composed of other gangue minerals such as, for example, talc, clays (i.e., silicates), etc. A portion of the slurry liquid was then withdrawn and the settling rate of the solids and the turbidity of the liquid measured. The results are set forth in Table 2, below:

TABLE 2

| Examples | Dose (g/ton) | Settling Rate (m/hour) | Turbidity (N.T.U.) |
|---|---|---|---|
| 1 | 0 | 0.6 | 240 |
| 2 | 5 | 1.0 | 235 |
| 3 | 10 | 3.0 | 250 |
| 4 | 20 | 5.6 | 250 |
| 5 | 40 | 8.1 | 110 |
| 6 | 80 | 14.8 | 33 |

The results demonstrated that increasing the amount of hydroxamated polymer contacted with the suspension resulted in a significant increase in the settling rate and a significant reduction in suspended solids in the liquid, as indicated by the decreased turbidities. The use of about 40 g/ton or more was found to be particularly effective for both increasing the settling rate of the tailings from a platinum ore mine and for improving the clarity of the liquid containing the suspended solids from the platinum ore mine. However, the amount of polymer can be varied depending on whether it is desired to increase either the settling rate of the solid or the clarity of the liquid.

EXAMPLES 7–12

To a slurry having a suspension of solids of platinum ore tailings was added 30 g/ton of either Polymer 4 or Polymer 5 by mixing at varying pH's, while the sample was maintained at ambient temperature. The platinum ore tailings included 14.41% $Fe_2O_3$, but were primarily composed of other gangue minerals such as, for example talc, clays (i.e., silicates), etc. A portion of the slurry liquid was then withdrawn and the settling rate of the solids and the turbidity of the liquid measured. The results are set forth in Table 3 below:

TABLE 3

| Example | Polymer | pH | Settling Rate (m/hour) | Clarity (NTU) |
|---|---|---|---|---|
| 7 | 4 | 6.5 | 7.7 | 3 |
| 8 | 4 | 4.9 | 0.9 | 82 |
| 9 | 4 | 4.3 | 0.6 | 78 |
| 10 | 5 | 6.3 | 9.9 | 9 |
| 11 | 5 | 5.1 | 2.7 | 65 |
| 12 | 5 | 3.5 | 0.5 | 80 |

The results demonstrated that even a relatively low degree of hydroxamation (e.g., 5 to 10%) resulted in efficient flocculation, as shown by the settling rate of the solids from the tailings of the platinum ore mines and clarity of the liquid containing the suspended solids from the platinum ore mine. The amount of hydroxamation can be varied depending on whether it is desired to increase the settling rate of the solid or the clarity of the liquid.

EXAMPLES 13–20

To a slurry having a suspension of solids of copper ore tailings was added in varying doses Polymer 1 by stirring at a pH of 8, while the sample was maintained at an ambient temperature. The copper ore tailings included 2.6% $Fe_2O_3$, but were primarily comprised of other gangue minerals. A portion of the slurry liquid was then withdrawn and the settling rate of the solids and the turbidity of the liquid measured. The results are set forth in Table 4, below:

TABLE 4

| Examples | Dose (g/ton) | Settling Rate (m/hour) | Turbidity (N.T.U.) |
|---|---|---|---|
| 13 | 0 | 0.8 | 130 |
| 14 | 5 | 1.0 | 94 |
| 15 | 10 | 1.5 | 74 |
| 16 | 20 | 1.9 | 67 |
| 17 | 30 | 3.6 | 75 |
| 18 | 50 | 4.2 | 58 |
| 19 | 75 | 5.8 | 52 |
| 20 | 100 | 9.1 | 42 |

The results demonstrated that increasing the amount of hydroxamated polymer contacted with the suspension resulted in a significant increase in the settling rate and a significant reduction in suspended solids in the liquid, as indicated by the decreased turbidities, particularly at doses of about 30 g/ton or greater.

EXAMPLES 21–24

To a slurry having a suspension of solids of copper ore tailings was added in varying doses Polymers 2 (Examples 21 & 22) or Polymer 3 (Examples 23 & 24) by stirring at a varying pH's while the sample was maintained at an ambient temperature. The copper ore tailings included 2.6% $Fe_2O_3$, but were primarily comprised of other gangue minerals. A portion of the slurry liquid was then withdrawn and the settling rate of the solids and the turbidity of the liquid measured. The results are set fourth in Table 5 below:

TABLE 5

| Examples | pH | Settling Rate (m/hour) | Clarify (NTU) |
|---|---|---|---|
| 21 | 8.08 | 12.1 | 33 |
| 22 | 12.94 | 12.2 | 4 |
| 23 | 8.12 | 3.3 | 49 |
| 24 | 13.02 | 5.6 | 27 |

The results demonstrated that varying the degree of hydroxamation resulted in effective flocculation, as shown by the settling rates of the suspended solids of tailings from the copper ore mines and the clarity of the liquid containing the suspended solids from the copper ore mine. The amount of hydroxamation can be varied depending on whether it is desired to improve the settling rate of the solid or the clarity of the liquid.

EXAMPLES 25–27

To a suspension of solids of waste slimes from a diamond mine, 20 g/ton of various polymers were added by stirring at a pH of between about 7 to 8, while the sample was maintained at an ambient temperature. The diamond slimes included 9.31% $Fe_2O_3$, but were primarily comprised of swelling clays. A portion of the slime liquid was then withdrawn and a measurement of suspended solids in the slime liquid is measured. The results are set forth in Table 6, below:

TABLE 4

| Examples | Polymer | Suspended Solids in Supernatant |
|---|---|---|
| 25* | Carboxylated polymer having no hydroxamation | 4.39% |
| 26 | 2 | 3.96% |
| 27 | 3 | 3.48% |

*Comparative

The results demonstrated a significant decrease in the suspended solids in the supernatant resulted from increasing the amount of hydroxamation of the polymer added to the suspension.

EXAMPLES 28–32

To a slurry of a suspension of solids of coal refuse varying doses of Polymer 6 were added by stirring at a pH of between about 7 and 8, while the sample was maintained at ambient temperature. The coal refuse included less than 1% iron oxide minerals and was primarily comprised of ash. A portion of the slurry liquid was then withdrawn and the settling rate of the solids and the turbidity of the liquid measured. The results are set forth in Table 7, below:

TABLE 7

| Example | Dose (g/ton) | Ash % | pH | Settling Rate (ft/hour) | Turbidity (N.T.U.) |
|---------|--------------|-------|-----|-------------------------|--------------------|
| 28 | 0.5 | 65 | 7.0 | 30 | 52 |
| 29 | 1 | 33 | 7.7 | 36 | 41 |
| 30 | 1.5 | 53 | 7.5 | 16 | 95 |
| 31 | 2 | 53 | 7.5 | 30 | 59 |
| 32 | 5 | 65 | 7.5 | 10 | 59 |

The amount of ash in the coal refuse correlates to the amount of non-carbonaceous minerals, such as clays including kaolinite, quartz, feldspar, muscovite, biotite, calcite, pyrite, etc. in the coal refuse. That is, the higher the ash content, the greater the amount of non-carbonaceous material present. The above examples had negligible concentrations of iron oxide or tin oxide. Although the prior art discloses that hydroxamated polymers did not flocculate such non-carbonaceous materials when present in a mixture with iron oxide or tin oxide, the results above show that when the hydroxamated polymer was contacted with the slurry containing a high amount of non-carbonaceous material having negligible iron oxide or tin oxide content, that the coal refuse was successfully flocculated. In fact, whereas it was expected that the non-carbonaceous materials would require several days to settle and would have a turbidity rate of well over 100 (N.T.U.), it was unexpectedly found that the hydroxamated polymers of the present invention effectively flocculated the suspended solids of such material.

EXAMPLES 33-37

To a slurry of a suspension of solids of coal refuse having negligible iron oxide and tin oxide content and an ash content of 65% a dose of 5 ppm of various polymers was added by stirring at a pH of 7.5 while the sample was maintained at ambient temperature. A portion of the slurry liquid was then withdrawn and the settling rate of the solids and the turbidity of the liquid measured. The results are set forth in Table 8, below:

TABLE 8

| Example | Polymer | Settling Rate (ft/hour) | Turbidity (N.T.U.) |
|---------|---------|-------------------------|--------------------|
| 33 | 7 | 10 | 70 |
| 34 | 8 | 6 | 67 |
| 35 | 9 | 20 | 77 |
| 36 | 10 | 20 | 65 |
| 37 | 11 | 2 | 85 |

Again, it was unexpectedly found that the hydroxamated polymers of the present invention effectively flocculate suspended non-carbonaceous solids from coal refuse having negligible iron oxide or tin oxide content and a high ash content.

EXAMPLES 38-44

To a slurry of a suspension of solids of tar sand tailings having a negligible iron oxide and tin oxide content was added in a dose of 25 ppm of various polymers was added by stirring at a pH of 9 while the sample was maintained at ambient temperature. A portion of the slurry liquid was then withdrawn and the settling rate of the solids and the turbidity of the liquid measured. The results are set forth in Table 9, below:

TABLE 9

| Example | Polymer | Settling |
|---------|---------|----------|
| 38* | Polyacrylamide | No flocculation |
| 39* | anionic polyacrylamide | No flocculation |
| 40* | polyamine (molecular weight of $5 \times 10^4$) (polymer of dimethylamine and epichlorohydrin) | Slight flocculation |
| 41* | polyamine (molecular weight of $7.5 \times 10^4$) (polymer of dimethylamine and epichlorohydrin) | No flocculation |
| 42* | polydiallyldimethylammonium | No flocculation |
| 43* | cationic polyacrylamide | No flocculation |
| 44 | Polymer 1 | Floc formation at rate of 3 inches per minute |

* = Comparative

The results show that flocculation resulted only with the use of hydroxamated polymer. Nonhydroxamated polymers resulted in no or negligible flocculation.

EXAMPLES 45-51

To a slurry having a suspension of solids of tar sand tailings having a negligible iron oxide and tin oxide content varying doses of a combination of Polymer 1 and a nonhydroxamated polymer of dimethylamine and epichlorohydrin were added by stirring at a pH of 9 while the sample was maintained at a temperature of about 80° C. A portion of the slurry liquid was then withdrawn and the settling rate of the solids and the turbidity of the liquid measured. The results are set forth in Table 10, below:

TABLE 10

| Example | Dose (ppm Polymer 1/Polyamine) | Settling Rate for Floc Formation (in/min) |
|---------|--------------------------------|-------------------------------------------|
| 45 | 100/25 | 4 |
| 46 | 50/10 | 4 |
| 47 | 50/25 | 4 |
| 48 | 25/0.5 | 4 |
| 49 | 25/5 | 4 |
| 50 | 25/10 | 4 |
| 51 | 25/25 | acceptable |

The results show that the use of hydroxamated polymer provided the necessary settling rate and that the amount of nonhydroxamated polymer did not significantly affect the flocculation rate.

The present invention is not to be limited in scope by the embodiment disclosed in the examples which are intended as illustrations of aspects of the invention and any methods which are functionally equivalent are within the scope of this invention. Indeed, various modifications of the invention in addition to those shown and described herein will become apparent to those skilled in the art from the foregoing description. Such modifications are intended to fall within the scope of the appended claims.

We claim

1. A process for flocculating, in a liquid other than Bayer process streams, suspended solids comprised of primarily minerals other than iron oxide and/or tin oxide, which process comprises contacting the solids with a hydroxamated polymer containing about 1 to about 90 mole percent hydroxamic groups wherein the amount of hydroxamated polymer is sufficient to increase the settling rate of the solids or to decrease the turbidity of the liquid as compared to the use of no polymer.

2. A process according to claim 1, wherein the polymer is an acrylamide polymer or a derivative thereof.

3. A process according to claim 2, wherein the acrylamide polymer is in the form of an emulsion.

4. A process according to claim 2, wherein the acrylamide polymer or derivative thereof has a solution viscosity of at least about 4.0 mPa.s.

5. A process according to claim 1, wherein the suspended solids comprise a dispersion obtained from a platinum ore body.

6. A process according to claim 1, wherein the suspended solids comprise a dispersion obtained from a copper ore body.

7. A process according to claim 1, wherein the suspended solids comprise a dispersion obtained from an ore-body from a diamond mine.

8. A process according to claim 1, wherein the suspended solids comprise a clay.

9. A process according to claim 1, wherein the suspended solids comprise a dispersion obtained from a body of coal.

10. A process according to claim 1, wherein the suspended solids comprise a dispersion obtained from a tar sand body.

11. A process according to claim 8, wherein the clay includes at least one of kaolinite, montmorillinite or bentonite.

* * * * *